United States Patent
Kumar et al.

(10) Patent No.: US 11,853,577 B2
(45) Date of Patent: Dec. 26, 2023

(54) TREE STRUCTURE NODE COMPACTION PRIORITIZATION

(71) Applicant: HEWLETT PACKARD ENTERPRISE DEVELOPMENT LP, Houston, TX (US)

(72) Inventors: Anirudha Kumar, San Jose, CA (US); Ammar Govind Ekbote, Renton, WA (US); Kumar Valendhar Thangavelu, San Jose, CA (US); Franklin George, San Jose, CA (US); Rajat Sharma, San Jose, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 173 days.

(21) Appl. No.: 17/449,100

(22) Filed: Sep. 28, 2021

(65) Prior Publication Data
US 2023/0113412 A1   Apr. 13, 2023

(51) Int. Cl.
| G06F 16/22 | (2019.01) |
| G06F 3/06 | (2006.01) |
| G06F 16/14 | (2019.01) |
| G06F 17/18 | (2006.01) |

(52) U.S. Cl.
CPC .......... G06F 3/0641 (2013.01); G06F 3/0608 (2013.01); G06F 3/0683 (2013.01); G06F 16/152 (2019.01); G06F 16/2246 (2019.01); G06F 17/18 (2013.01)

(58) Field of Classification Search
CPC ................................................ G06F 16/2246
See application file for complete search history.

(56) References Cited

U.S. PATENT DOCUMENTS

| 9,355,109 | B2 | 5/2016 | Archak et al. |
| 9,977,746 | B2 | 5/2018 | Muppalaneni et al. |
| 10,042,710 | B2 | 8/2018 | Mutalik et al. |
| 10,127,266 | B2 | 11/2018 | Mandagere et al. |
| 10,162,318 | B2 | 12/2018 | Poss et al. |
| 10,169,365 | B2 | 1/2019 | Maheshwari |
| 10,200,954 | B2 | 2/2019 | Skocypec et al. |
| 10,291,633 | B1 | 5/2019 | Harang et al. |
| 10,558,705 | B2 | 2/2020 | Sengupta et al. |
| 11,461,299 | B2 | 10/2022 | Killamsetti et al. |
| 11,556,513 | B2 | 1/2023 | Killamsetti et al. |

(Continued)

FOREIGN PATENT DOCUMENTS

CN     106708749     8/2019

OTHER PUBLICATIONS

Bender, M. A., et al.; "An Introduction to Bϵ-trees and Write-Optimization"; Oct. 2015; 8 pages.

(Continued)

*Primary Examiner* — Merilyn P Nguyen
(74) *Attorney, Agent, or Firm* — Trop, Pruner & Hu, P.C.

(57) ABSTRACT

In some examples, a system arranges data in a plurality of nodes in a tree structure, where a given node of the plurality of nodes is associated with a probabilistic data structure that provides a probabilistic indication of whether data is present in the given node. The system determines, for reads of the given node, a false positive measure of false positives indicated by the probabilistic data structure, and prioritizes a compaction of the given node based on the determined false positive measure.

20 Claims, 7 Drawing Sheets

(56) References Cited

U.S. PATENT DOCUMENTS

| | | | |
|---|---|---|---|
| 11,681,453 | B2 | 6/2023 | Vanninen |
| 11,687,253 | B2 | 6/2023 | Pol |
| 2011/0149973 | A1* | 6/2011 | Esteve Rothenberg ............ H04L 45/34 370/392 |
| 2015/0347477 | A1 | 12/2015 | Esmet |
| 2015/0347547 | A1 | 12/2015 | Kasheff et al. |
| 2016/0034587 | A1* | 2/2016 | Barber .............. G06F 16/24532 707/754 |
| 2018/0011892 | A1 | 1/2018 | Kimura |
| 2018/0225315 | A1 | 8/2018 | Boles et al. |
| 2020/0050676 | A1 | 2/2020 | Li et al. |
| 2020/0057782 | A1 | 2/2020 | Idreos et al. |
| 2020/0089788 | A1 | 3/2020 | Johnson et al. |
| 2020/0250148 | A1* | 8/2020 | Dayan .................. G06F 7/14 |
| 2021/0406237 | A1 | 12/2021 | Killamsetti et al. |

OTHER PUBLICATIONS

Bradley C. Kuszmaul, "How Fractal Trees Work," Nov. 2011, <https://www.percona.com/blog/wp-content/uploads/2011/11/how-fractal-trees-work.pdf> (52 pages).

Bradley C. Kuszmaul, "How TokuDB Fractal TreeTM Indexes Work," Nov. 2010, <http://mit.uvt.rnu.tn/courses/electrical-engineering-and-computer-science/6-172-performance-engineering-of-software-systems-fall-2010/video-lectures/lecture-19-how-tokudb-fractal-tree-indexes-work/MIT6_172F10_lec19.pdf> (40 pages).

Callaghan, M.; "Read, write & space amplification—pick 2"; Nov. 23, 2015; 2 pages.

Dayan et al., "Optimal Bloom Filters and Adaptive Merging for LSM-Trees," ACM Trans. Datab. Syst. 1, 1, Article 1, Dec. 2018, 45 pages. <https://stratos.seas.harvard.edu/files/stratos/files/monkeytods.pdf>.

Dayan, N., et al.; "Dostoevsky: Better space-time trade-offs for LSM-tree based key-value stores via adaptive removal of superfluous merging"; May 2018; 16 pages.

Dayan, N., et al.; "Monkey: Optimal navigable key-value store"; May 2017; 16 pages.

Jannen, W. et al.; "BetrFS: A Right-optimized Write-optimized File System"; Feb. 16-19, 2015; 16 pages.

Kaiyrakhmet, O. et al.; "SLM-Db: Single-level Key-value Store with Persistent Memory"; Feb. 25-28, 2019; 16 pages.

Killamsetti et al., U.S. Appl. No. 16/916,623 entitled Key-Value Index With Node Buffers filed Jun. 30, 2020 (54 pages).

Killamsetti et al., U.S. Appl. No. 16/916,645 entitled Generating Snapshots of a Key-Value Index filed Jun. 30, 2020 (48 pages).

Killamsetti et al., U.S. Appl. No. 16/916,667 entitled Searching Key-Value Index With Node Buffers filed Jun. 30, 2020 (54 pages).

Percona; "TokuDB Variables"; 30 pages; printed on Dec. 16, 2019 from webpage: https://www.percona.com/doc/percona-server/LATEST/tokudb/tokudb_variables.html.

Wikipedia, "Bloom filter," Apr. 20, 2021, <https://en.wikipedia.org/w/index.php?title=Bloom_filter&oldid=1018868454> (21 pages).

Wu, X. et al.; "LSM-TRIE: An LSM-tree-based Ultra-large Key-value Store for Small Data"; Jul. 8-10, 2015; 13 pages.

Yoon et al. "Mutant: Balancing storage cost and latency in lsm-tree data stores," Proceedings of the ACM Symposium on Cloud Computing, 2018, 12 pages.

\* cited by examiner

TREE STRUCTURE NODE COMPACTION PRIORITIZATION

BACKGROUND

Data reduction techniques can be applied to reduce an amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, storage systems use indexes to indicate relationships or mappings between keys and values (also referred to herein as "key-value pairs"). A key-value index that includes key-value pairs can be used to perform data deduplication in a storage system based on "fingerprints" of incoming data units, where each fingerprint is associated with a particular data unit. Such a key-value index is also referred to as a "fingerprint index." More generally, a "fingerprint index" can refer to an index that maps fingerprints of data units to respective location information of the data units.

A "storage system" can include a collection of storage devices (a single storage device or multiple storage devices). A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data.

In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

A "fingerprint" refers to a value derived by applying a function on the content of a data unit (where the "content" can include the entirety or a subset of the content of the data unit). An example of the function that can be applied includes a hash function that produces a hash value based on the incoming data unit. Examples of hash functions include cryptographic hash functions such as Secure Hash Algorithm 2 (SHA-2) hash functions, e.g., SHA-224, SHA-256, SHA-384, etc. In other examples, other types of hash functions or other types of fingerprint functions may be employed.

In the present discussion, a "fingerprint" can refer to a full fingerprint or a partial fingerprint. A full fingerprint includes the entire value computed by the fingerprint function based on the content of a data unit. A partial fingerprint includes a portion (less than all bits) of the full fingerprint.

A fingerprint of an incoming data unit is compared to a fingerprint index, which may be a key-value index in which fingerprints are the keys and the corresponding data locations are the values. A "storage location indicator" can refer to any information that provides an indication of a storage location of a data unit in a persistent storage. A "storage location indicator" can also be referred to as "location information" of a data unit.

In some examples, a storage location indicator can be in the form of a sequential block number (SBN). An SBN is useable to determine where a data unit is physically stored in a persistent storage. However, in some examples, the SBN does not actually identify the physical location, but rather, the SBN can be used to derive a physical address or other value that identifies a physical location. In other examples, other types of storage location indicators can be employed.

During a data deduplication operation performed for an incoming data unit received at a storage system, a match between a fingerprint generated for the incoming data unit and a fingerprint stored in the fingerprint index indicates that the incoming data unit may be a duplicate of a data unit already stored in the storage system. If the incoming data unit is a duplicate of an already stored data unit, instead of storing the duplicative incoming data unit, a reference count stored in the storage system can be incremented to indicate the number of instances of the data unit that have been received, and a reference to the data unit is stored in the storage system instead of the incoming data unit.

A key-value index may be stored as a tree structure of nodes, starting at a root node that has child nodes. The child nodes of a root node can include internal nodes (referred to as an "indirect" nodes herein) or leaf nodes. Each indirect node can also have child nodes, which can include lower level indirect nodes or leaf nodes.

Each leaf node of a key-value index stores key-value data (e.g., key-value pairs). In some examples, a given leaf node stores key-value pairs for keys within a given range (e.g., fingerprint values). For example, a first leaf node stores key-value pairs with keys in a first range, a second leaf node stores key-value pairs with keys in a different second range, and so forth.

Each root node and indirect node of the key-value index can include a node buffer, which is a storage structure (e.g., contained in a memory). A "memory" can be implemented using a non-volatile random access memory (NVRAM) and/or a volatile memory. An NVRAM can be implemented using electrically erasable programmable read-only memory (EEPROM) device(s). In other examples, an NVRAM can be implemented using battery-backed dynamic random access memory (DRAM) device(s) or battery-backed static random access memory (SRAM) device(s). A volatile memory can be implemented using DRAM device(s), SRAM device(s), or any other type of memory where data stored in the memory is lost if power were removed from the memory.

The node buffer of the root node or indirect node of a key-value index can store key-value pairs. The node buffer of a root node can store key-value pairs for the entire possible range of key values (e.g., all possible values of fingerprints). The node buffer of a given indirect node stores key-value pairs associated with a respective range of keys. The node buffers of different indirect nodes store key-value pairs for different ranges of keys. Stated differently, each of the indirect nodes may be associated with a different portion of the range of keys in the node buffer of root node.

The node buffer of a root node or an indirect node continues to store respective key-value pairs until a threshold fill level for the node buffer is reached, which may cause the stored key-value pairs in the node buffer to be transferred to child nodes (the transfer of key-value pairs down the tree structure of the key-value index involves trickling updates of key-value pairs down the tree structure). The "threshold fill level" can refer to a threshold amount of used space of the node buffer that has been consumed (referred to as "node buffer usage") in storing data (e.g., the key-value pairs). The threshold amount of used space can be referred to as a threshold percentage of the overall space of the node buffer, or a threshold size of the node buffer that has been consumed in storing data.

The transfer of key-value pairs down the tree structure is performed as part of a compaction of nodes of the key-value index. When the node buffer of a node of the key-value index is compacted, the key-value pairs in the node buffer are distributed to child node(s) according to the range of keys of each child node.

In some examples, each root node or indirect node of the key-value index may include a probabilistic data structure and fence pointers (fence pointers are discussed further below). In some examples, the probabilistic data structure includes a Bloom filter. A Bloom filter is an example of a probabilistic data structure that is used to test whether an element is a member of a set, which in some examples of the present disclosure is to test whether a fingerprint computed for a data unit is included in a node buffer of a node of the key-value index. A Bloom filter can return a false positive match, which falsely indicates that an element is a member of the set (i.e., the Bloom the filter indicates that the element is a member of the set when in fact the element is not a member of the set). In the context of a fingerprint index, a Bloom filter may falsely indicate that a fingerprint is present in the node buffer of a given node of the fingerprint index, when in fact the fingerprint is not present in the node buffer of the given node. More generally, the Bloom filter may falsely indicate that data is present in a given node of a tree structure when the data is not present in the given node.

However, a Bloom filter does not return a false negative. In other words, the Bloom filter can return either a result that data is possibly in a node of the tree structure, or the data is definitely not in the node of the tree structure.

As nodes (including indirect nodes) of a key-value index fill up with key-value pairs and cross a threshold fill level for the nodes, compaction processes to compact the nodes that have been filled up above the threshold fill level may be triggered. Note that the threshold fill level for each node buffer in the key-value index may be the same, or may be different.

An issue associated with reading the key-value index is read amplification. When a Bloom filter of a given node of the key-value index returns a positive result in response to a lookup of the given node for a fingerprint computed based on an incoming data unit, a storage controller can read a content of the node buffer of the given node into a memory. Note that in some cases, the content of the node buffer that is loaded into the memory includes a portion of the node buffer of the given node. The portion of the node buffer read into the memory can be a portion less than an entirety of the content of the node buffer, or alternatively the portion can be the entirety of the content of the node buffer. Reading a portion of the node buffer that is less than the entirety of the content of the node buffer is based on the use of fence pointers, which are discussed further below. The storage controller then searches the portion of the node buffer loaded into the memory for a key (fingerprint) matching the key (fingerprint) of the incoming data unit. If in fact there is a matching key (fingerprint) in the key-value index, then that indicates that the incoming data unit is duplicative of another data unit previously stored in the storage system, in which case the incoming data unit would not have to be stored again.

If it turns out that the positive result returned by the Bloom filter for the given node is a false positive, then the portion of the node buffer of the given node read into the memory would not include the key (fingerprint) matching the key (fingerprint) of the incoming data unit, in which case the storage controller would continue a lookup of lower level(s) of the key-value index to determine if the key (fingerprint) for the incoming data unit is in the lower level(s) of the key-value index. The lookup continues down to the leaf nodes. If the storage controller confirms that the key (fingerprint) is not in the key-value index, the storage controller inserts the fingerprint of the incoming data unit into the key-value index, and stores the incoming data unit in the persistent storage. The false positive resulted in an unnecessary read of data from the node buffer of the given node into the memory, which consumes resources of the memory and competes for bandwidth of the storage system. Many false positives when performing lookups of the key-value index can result in read amplification in which many reads of data from nodes of the key-value index into a memory occur where the reads do not provide productive data useful for data deduplication. It is thus desirable to reduce read amplification associated with lookups of the key-value index.

The foregoing refers to examples in which lookups of the key-value index are associated with writes of incoming data units. In further examples, lookups of the key-value index can be performed as part of reads to lookup corresponding fingerprints. False positive may also be associated with such lookups.

To reduce false positives, compaction of indirect nodes of the key-value index can be performed to reduce the amounts of data stored in the respective node buffers. The more data a given node buffer contains (e.g., a Bloom filter for the given node buffer represents a larger quantity of fingerprints in the given node buffer), the more likely the Bloom filter is to return a false positive in response to a lookup of a fingerprint. Reducing an amount of data stored in the given node buffer reduces the chances that a Bloom filter of the respective node will produce a false positive in response to a lookup of the respective node for an incoming data unit. As noted above, compacting a node refers to distributing key-value pairs of the node to child nodes of the node.

However, compacting node buffers of nodes of the key-value index is associated with consumption of processing and storage resources as data is moved from a higher level node to a lower level node. When there are a large number of compaction processes to be applied to multiple nodes of the key-value index, competition for processing and storage resources may mean that some compaction processes may be delayed while other compaction processes are performed.

In accordance with some implementations of the present disclosure, prioritization of compaction of nodes of a key-value index can be based on observed false positive measures associated with reading the respective nodes of the key-value index. Prioritization of compaction of nodes based on observed false positive measures can include either or both of the following: 1) prioritizing selection of a node of the key-value index for compaction based on observed false positive measures (among multiple factors in some examples) of the nodes, or 2) once compaction jobs have been selected for respective nodes, prioritizing the compaction jobs based on observed false positive measures (among multiple factors in some examples) of the respective nodes. For example, for nodes of the key-value index, a node selected (from among the multiple nodes) for compaction can be the one with a higher priority, such as based on a higher observed false positive measure and possibly other factor(s). In some examples, nodes considered for compaction are those with node buffer usages that exceed the threshold fill level, and the prioritization of selection of nodes for compaction based on the observed false positive measures can be for those nodes with node buffer usages that exceed the threshold fill level. In other examples, all nodes of the key-value index are considered for compaction, and selection of all such nodes to compact can be based on the observed false positive measures of the nodes.

As another example, once nodes have been identified and scheduled for compaction because the node buffer usages of such nodes have exceeded the threshold fill level, priorities of compaction jobs for the nodes can be assigned based on the observed false positive measures (and possibly other factor(s)). For example, a first compaction job to compact a first node of the key-value index is assigned a higher priority than a priority of a second compaction job to compact a second node of the key-value index if a false positive measure in lookups of the first node is greater than a false positive measure in lookups of the second node.

Figure 1:
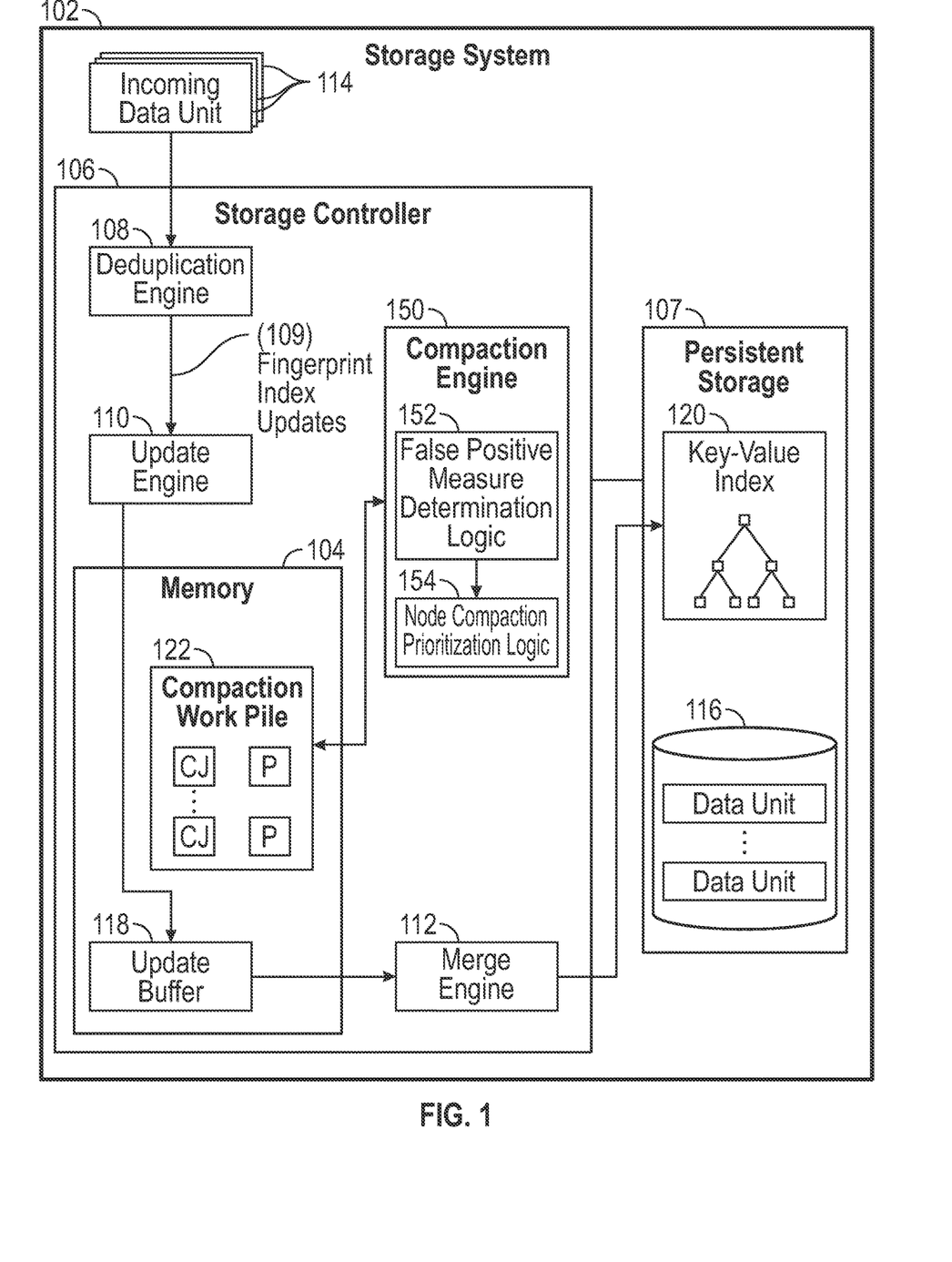
FIG. 1 is a block diagram of an arrangement that includes a storage system according to some examples.

FIG. 1 shows an example of a storage system 102 that includes a memory 104 (a volatile memory and/or an NVRAM) and a persistent storage 107. Although a specific arrangement of components is shown in FIG. 1, it is noted that in other examples, the storage system 102 can include a different arrangement of components.

The storage system 102 also includes a storage controller 106 that includes various engines, including a deduplication engine 108, an update engine 110, a merge engine 112, and a compaction engine 150. Although specific engines are depicted in the example of FIG. 1, the storage controller 103 can include fewer or more engines in other examples. Note that the storage controller 106 can be part of the storage system 102, or can be separate from the storage system 102 (e.g., coupled to the storage system 102 over a network).

Each engine can refer to a portion of a hardware processing circuit of the storage controller 106, or alternatively, can refer to machine-readable instructions (software and/or firmware stored on at least one machine-readable storage medium) executable by the hardware processing circuit of the storage controller 106. Also, in other examples, some of the engines may be separate from the storage controller 106.

As incoming data units 114 (of write requests) are received by the storage system 102, fingerprint index updates 109 can be created for the incoming data units 114. The write requests can be received from a requester device (or multiple requester devices) that is (are) coupled to the storage system 102 over a network, such as a local area network (LAN), a wide area network (WAN), a storage area network (SAN), and so forth. A requester device can refer to a server computer, a desktop computer, a notebook computer, a tablet computer, a smartphone, or any other type of electronic device.

After data deduplication applied by the deduplication engine 108, data units 117 of the write requests can be written to a data store 116 in the persistent storage 107. Due to the application of data deduplication, the data units 117 stored in the data store 116 are unique data units (i.e., the data units 117 do not include duplicative data units). In further examples, the data deduplication applied by the deduplication engine 108 reduces (but does not eliminate) occurrences of duplicative data units stored in the data store 116.

A "fingerprint index update" produced by the deduplication engine 108 in response to an incoming data unit 114 can include update information for a fingerprint index (in the form of a key-value index 120 shown in FIG. 1). The key-value index 120 includes a hierarchical arrangement of nodes in a tree structure and is stored in the persistent storage 107. In an example, a fingerprint index update 109 for an incoming data unit 114 can include a fingerprint (e.g., a hash value) computed by applying a fingerprint function (e.g., a hash function) on the incoming data unit 114, and a storage location indicator (e.g., an SBN) for the incoming data unit 114.

The update engine 110 receives fingerprint index updates 109 from the deduplication engine 108. The update engine 110 temporarily stores each fingerprint index update 109 in an update buffer 118 in the memory 104. Although FIG. 1 shows a single update buffer 118, it is noted that multiple buffers can be employed to store fingerprint index updates 109. For example, the update buffer 118 can include an active update buffer and a synchronization buffer, where the active update buffer is used to receive fingerprint index updates 109, while fingerprint index updates 109 in the synchronization buffer are merged (flushed) by the merge engine 112 into the key-value index 120. Merging a fingerprint index update 109 into the key-value index 120 can refer to moving a key-value pair of the fingerprint index update 109 from the update buffer 118 into a corresponding node of the key-value index 120.

The fingerprint index updates 109 are accumulated in the update buffer 118 before being merged (inserted) into nodes of the key-value index 120. The fingerprint index updates 109 are inserted, by the merge engine 112, to node buffer(s) of node(s) closest to a root node of the key-value index 120.

In some examples, compaction of nodes of the key-value index 120 is performed independently of (asynchronously with respect to) any merge of fingerprint index updates 109 from the update buffer 118 to the key-value index 120.

Asynchronous compaction of nodes of the key-value index 120 is contrasted with synchronous compaction of nodes that occur as fingerprint index updates are merged into the nodes of the key-value index 120. With synchronous compaction, as merging of fingerprint index updates into the nodes of the key-value index 120, compaction of nodes can be triggered to trickle the fingerprint index updates to lower level nodes of the key-value index 120, until the key-value pairs reach leaf nodes of the key-value index 120.

During the synchronous compaction, as compaction is performed of nodes in the key-value index 120, the compaction can trigger further compaction of lower level nodes as the lower level nodes fill up. Such compaction is a recursive process where compaction of a first collection of indirect nodes (including a single indirect node or multiple indirect nodes) of the key-value index 120 can cause compaction in a collection of lower level indirect nodes, until the updates reach node buffers that can absorb the key-value pairs of the fingerprint index updates without further compaction, or until the key-value pairs reach the leaf nodes of the key-value index 120. The synchronous compaction process performed synchronously with (i.e., inline with) a merge operation may be inefficient in terms of the usage of processing and memory resources of the storage system 102.

In accordance with some implementations of the present disclosure, the merge processes and compaction processes are decoupled, so that compaction processes are deferred until resources are available in the storage system 102 to perform the compaction. The compaction processes are performed independently of any merge processes.

In some examples, the compaction of each indirect node can be performed in isolation to avoid recursive compactions; in other words, the compaction of a higher level indirect node does not trigger a compaction of a lower level indirect node as the key-value pairs of the higher level indirect node are moved into the lower level indirect node.

In some examples, a portion of the key-value index 120 may be retrieved into the memory 104 of the storage controller 106 to improve performance in accessing portions of the key-value index 120. In the present discussion, reference to "key-value index 120" can refer to the key-value index 120 in the persistent storage 107 and/or any portion of the key-value index 120 copied to the memory 104 of the storage controller 106.

When a compaction criterion is satisfied for a given node of the key-value index 120 (e.g., the node buffer usage of the given node exceeds the threshold fill level), a compaction job can be inserted into a compaction work pile 122, which can be stored in the memory 104 in some examples. A "compaction work pile" can refer to a temporary storage structure (a "compaction job scheduling structure") that is used to store information pertaining to compaction jobs ("CJ" in FIG. 1) to be performed. Inserting a compaction job into the compaction work pile 122 refers to inserting information of the compaction job into the compaction work pile 122. The information of the compaction job can identify a respective node of the key-value index 120 for which compaction is to be performed, and other related information associated with the compaction job and/or the respective node.

Effectively, the compaction work pile 122 includes a collection of compaction jobs ("CJ") to be scheduled for operation. A compaction job can be performed by the compaction engine 150, which compacts a respective node of the key-value index 120 by moving key-value pairs in the node buffer of the respective node to child node(s) of the respective node.

The compaction engine 150 includes a false positive measure determination logic 152 and a node compaction prioritization logic 154. A "logic" of the compaction engine 150 can refer to a portion of the hardware processing of the compaction engine 150, or alternatively, can refer to machine-readable instructions (software and/or firmware stored on at least one machine-readable storage medium) executable by the hardware processing circuit of the compaction engine 150.

In some examples, the false positive measure determination logic 152 determines a false positive measure for each node in the key-value index 120. The false positive measure determination logic 152 can count a quantity of false positives returned by a Bloom filter for a respective node during a given time interval (e.g., a sampling time interval). Dividing this count of false positives by the time interval provides a false positive rate. In some examples, the false positive measure for the respective node determined by the false positive measure determination logic 152 is the false positive rate. In further examples, the false positive measure can include the quantity of false positives. In other examples, other false positive measures can be used by the false positive measure determination logic 152.

In some examples, the node compaction prioritization logic 154 can assign priorities to the respective nodes associated with compaction jobs. Assigning a priority to a node associated with a compaction job can refer to assigning the priority to the compaction job. In FIG. 1, the priorities ("P") assigned to respective compaction jobs can be added to the compaction work pile 122 in association with the respective compaction jobs.

In some examples, the node compaction prioritization logic 154 calculates a priority for a compaction job based on a corresponding false positive measure of false positives returned by a Bloom filter of a node associated with the compaction job. For example, the priority can be a value within a range that is correlated proportionally to the false positive measure (e.g., a higher priority is assigned for a higher false positive measure). In other examples, the node compaction prioritization logic 154 can calculate a priority for a compaction job based on the corresponding false positive measure as well as one or more other factors, such as the fill level of the corresponding node buffer, and possibly other factors.

In the latter examples, the priority assigned to a node associated with a compaction job can be a weighted sum of a false positive measure computed for the node and a fill level of the node buffer (e.g., a percentage of the node buffer consumed, an amount of data stored by the node buffer, etc.), and possibly other factors.

Based on the priorities ("P") assigned to the respective compaction jobs ("CJ") in the compaction work pile 122, the compaction engine 150 can select a compaction job (from among the compaction jobs in the compaction work pile 122) for execution. For example, the compaction engine 150 can compare the priorities of the compaction jobs in the compaction work pile 122, and can select the compaction job assigned the highest priority for execution to compact a respective node of the key-value index 120.

The foregoing refers to examples in which priorities are assigned to compaction jobs in the compaction work pile 122 based on the observed false positive measures of the respective nodes. Alternatively, or additionally, the node compaction prioritization logic 154 can prioritize a selection of a node of the key-value index 120 to add to the compaction work pile 122 based on the observed false positive measures of the nodes in the key-value index 120. For example, for each node of the key-value index 120 (e.g., a node with a node buffer usage that exceeds the threshold fill level or any node in the key-value index 120), a priority can be assigned to the node based on the observed false positive measure of the node (and possibly other factor(s) such as the fill level of the node buffer of the node) for use in selecting from among multiple nodes to add to the compaction work pile 122. Selecting a node to add to the compaction work pile 122 refers to adding a compaction job for the node to the compaction work pile 122.

Figure 2:
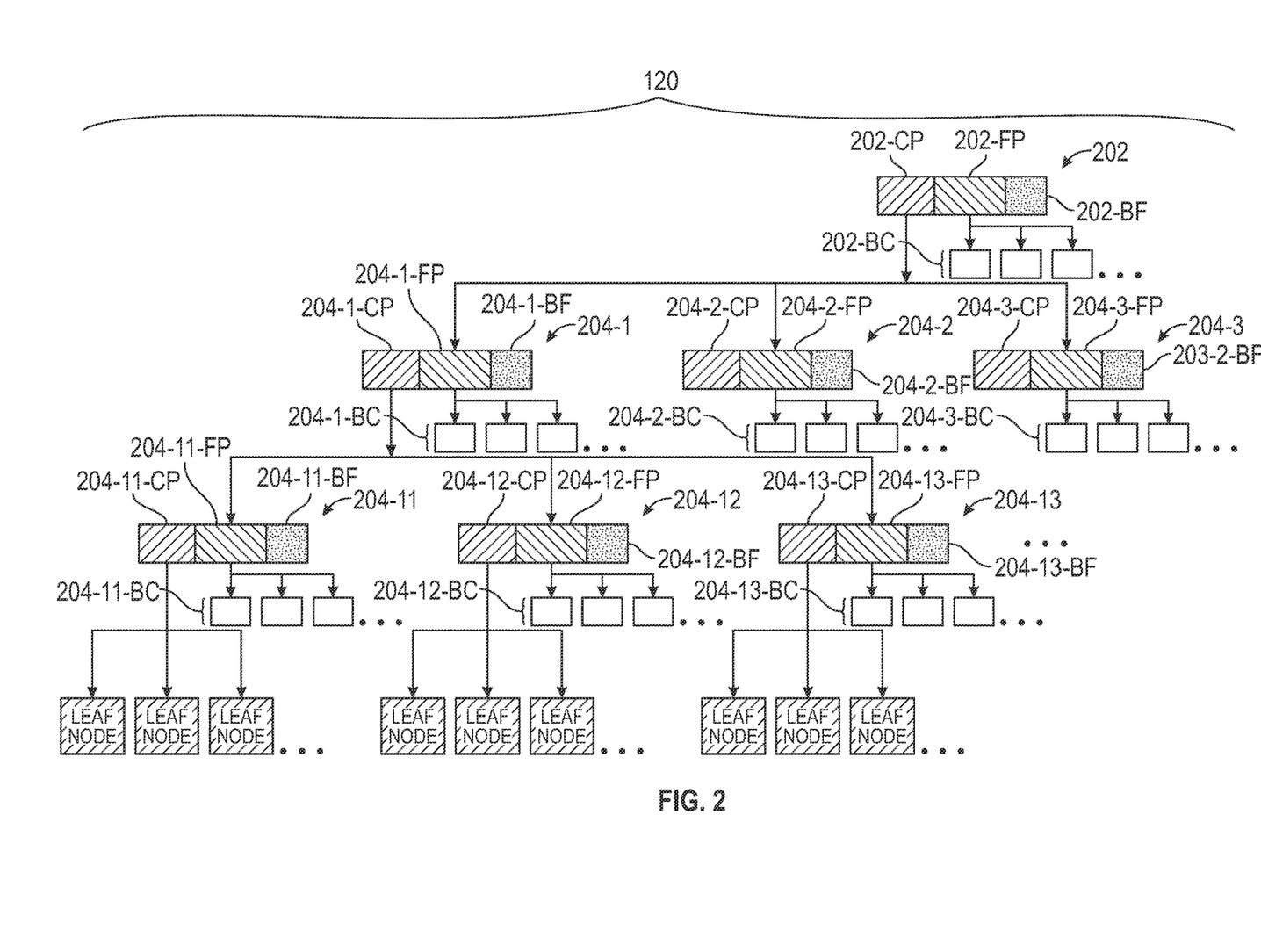
FIG. 2 is a block diagram of a key-value index according to some examples.

An example of the key-value index 120 is depicted in FIG. 2. In the example of FIG. 2, the key-value index 120 includes a root node 202 that has various child indirect nodes 204-1, 204-2, 204-3, and so forth.

Each indirect node in turn can have additional child nodes. In the example of FIG. 2, the indirect note 204-1 has child indirect nodes 204-11, 204-12, 204-13, and so forth.

Each of the indirect nodes 204-11, 204-12, 204-13, and so forth, can in turn have further child nodes, such as leaf nodes.

In the example of FIG. 2, the key-value index 120 has 4 hierarchical levels, where the highest level includes the root node of 202 and the lowest level includes the leaf nodes. The indirect nodes 204-11, 204-12, and 204-13 are at a lower level in the hierarchy than the indirect node 204-1.

A level of the key-value index 120 that is closer to the root node 202 is at a higher level than another level that is farther away from the root node 202 in the hierarchy of the key-value index 120.

Each node of the key-value index other than leaf nodes may include the following elements: child pointers, fence pointers, a Bloom filter, and buffer chunks that collectively form a node buffer.

For example, the root node 202 includes child pointers 202-CP, fence pointers 202-FP, a Bloom filter 202-BF, and buffer chunks 202-BC. For each of the indirect nodes 204-1, 204-2, 204-3, 204-11, 204-12, and 204-13 shown in FIG. 2, the child pointers are identified by the suffix "-CP" following the reference numeral of the indirect node (e.g., 204-1-CP), the fence pointers are identified by the suffix "-FP" following the reference numeral of the indirect node (e.g., 204-1-FP), the Bloom filter is identified by the suffix "-BF" following the reference numeral of the indirect node (e.g., 204-1-BF), and the buffer chunks are identified by the suffix "-BC" following the reference numeral of the indirect node (e.g., 204-1-BC).

Child pointers are values that point to or otherwise reference nodes that are immediate child nodes of the respective non-leaf node (a root node or an indirect node) in the key-value index 120. For example, the child pointers 202-CP of the root node 202 refer to the indirect nodes 204-1, 204-2, 204-3, and so forth that are immediate child nodes of the root node at 202. Similarly, the child pointers 204-1-CP of the indirect node 204-1 refer to indirect nodes 204-11, 204-12, 204-13, and so forth, that are immediate child nodes of the indirect node 204-1.

In some examples, the child pointers of an indirect node may be generated the first time that the indirect node is compacted (e.g., when an amount of data in the node buffer of the indirect node exceeds a threshold fill level) and the compaction job for the indirect node has been selected for execution by the compaction engine 150.

In some examples, the child pointers and/or the fence pointers and/or the Bloom filters of the root node 202 and the indirect nodes of the key-value index 120 may be copied to the memory 104 of the storage controller 106, for faster access.

The Bloom filter of a non-leaf node is used to determine whether a key (a fingerprint of an incoming data unit 114) is included in a respective node buffer of the non-leaf node (with a possibility of false positives). The Bloom filter indicates which keys are not included in the respective node buffer, and indicates keys that may be included in the node buffer with some possibility that such an indication may be a false positive indication.

If the Bloom filter indicates that a given key generated for an incoming data unit 114 is included in a node buffer of a particular indirect node, a portion of the node buffer is retrieved into the memory 104 (FIG. 1), and the deduplication engine 108 can search the portion of the node buffer retrieved into the memory 104 node buffer to find the given key. In some examples, the fence pointers of the particular indirect node may be used to identify a particular buffer chunk that is likely to store key-value pairs including the given key. In some examples, a fence pointer may identify the lowest key and/or the highest key of each buffer chunk. For example, each fence pointer may identify a lower bound (and/or an upper bound) of keys included in the corresponding buffer chunk (in other words, each fence pointer indicates a key range for a buffer chunk such that key-value pairs with keys in the key range are stored in the buffer chunk). The fence pointers may be used to identify which buffer chunk includes a key range that the given key falls into. Accordingly, instead of loading the entire content of the node buffer for the particular indirect node into the memory 104, just the identified buffer chunk is loaded into the memory 104, which reduces the amount of data read into the memory 104 and thus reduces memory resource consumption and persistent storage consumption in association with key-index node lookups.

Figure 3A:
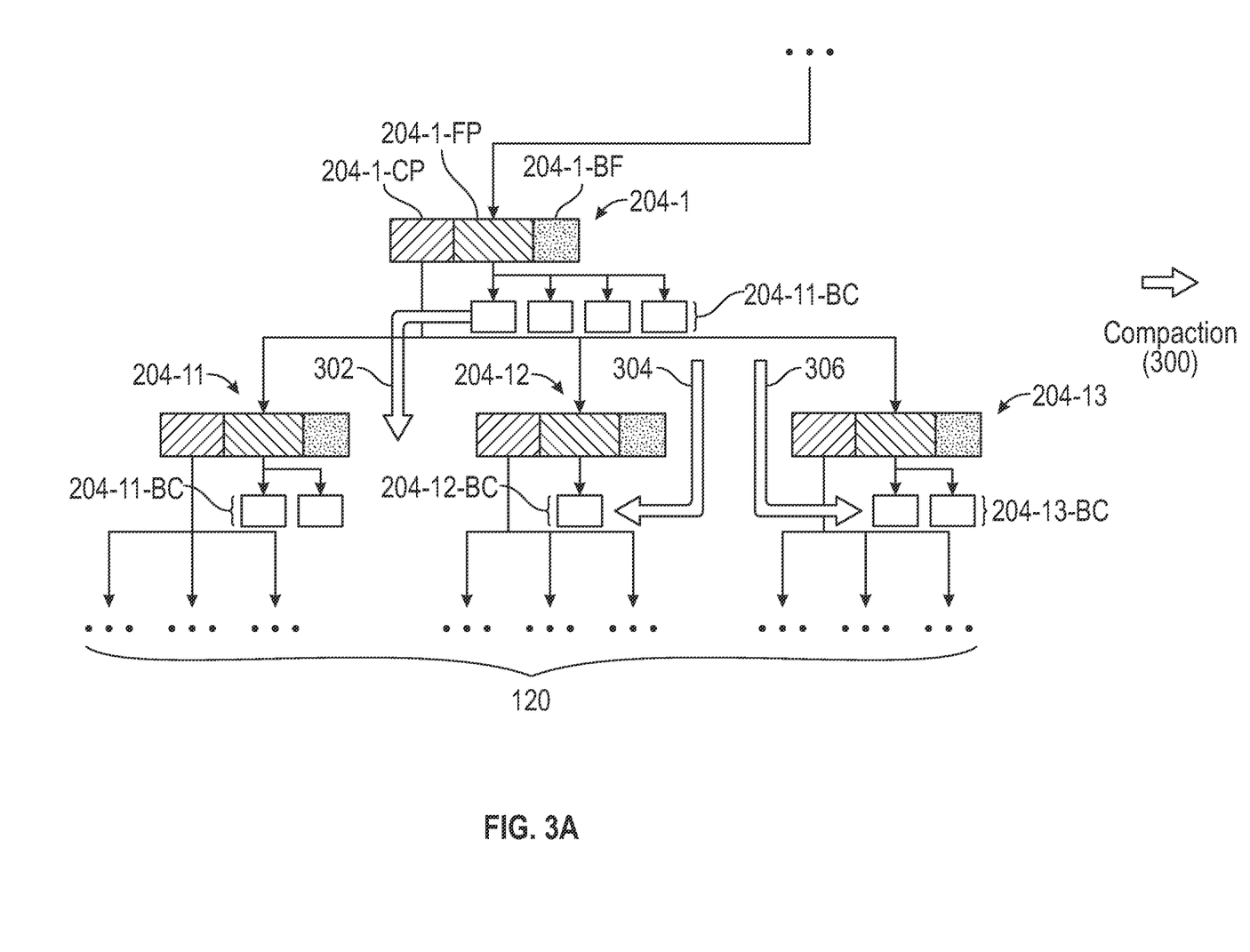
FIGS. 3A-3B illustrate an example of compaction of an indirect node in a key-value index according to some examples.
Figure 3B:
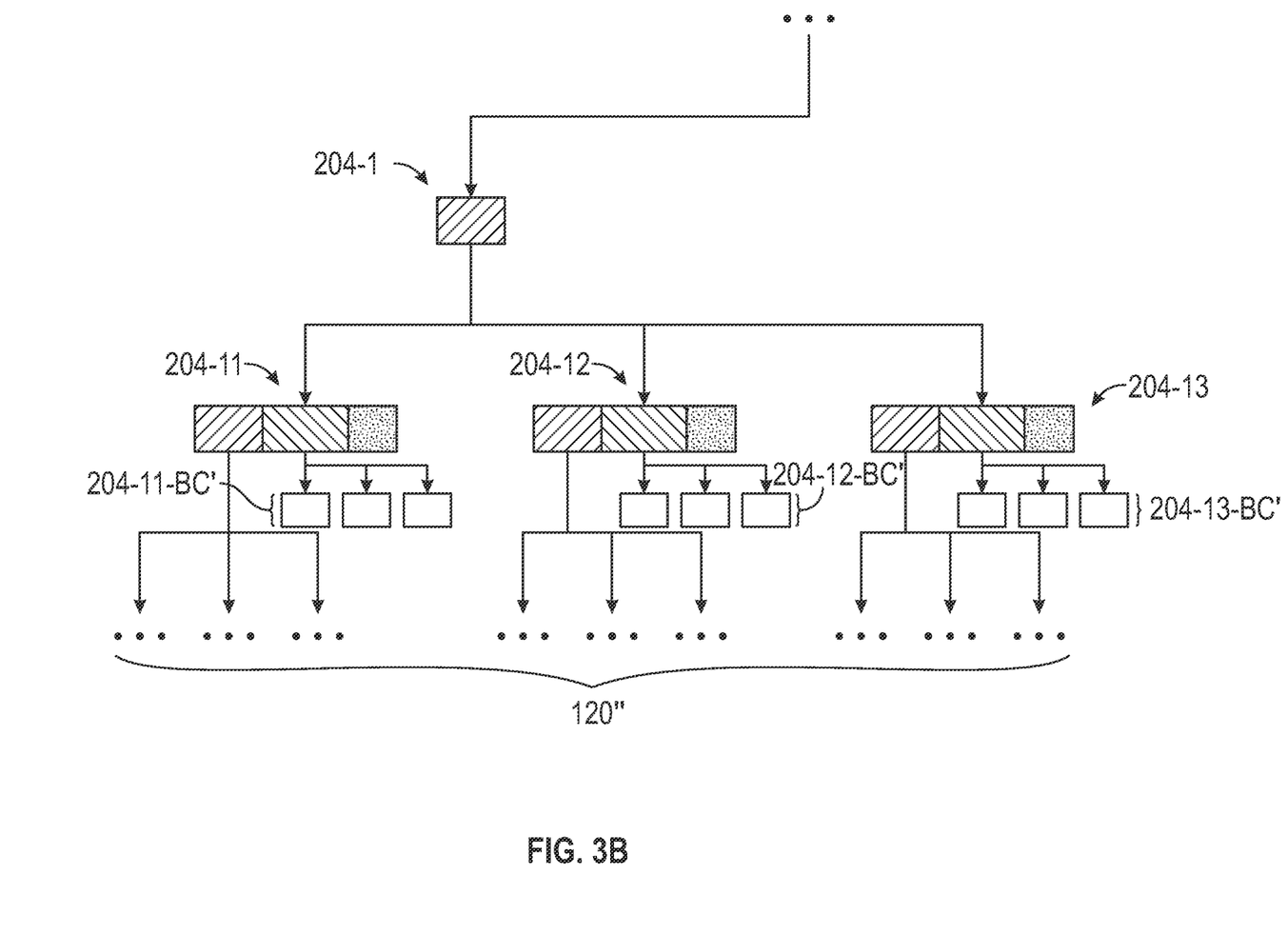

FIGS. 3A-3B show an example compaction process 300 performed with respect to the indirect node 204-1. FIG. 3A shows a portion of the key-value index 120. FIG. 3A shows a state of the key-value index 120 prior to compaction of the indirect node 204-1, and FIG. 3B shows a state of the key-value index (represented as 120") following the compaction process 300 in which the indirect node 204-1 was compacted.

It is assumed that the node buffer of the indirect node 204-1 (made up of four buffer chunks 204-1-BC) has been filled to exceed the threshold fill level. It is also assumed that the compaction job for the indirect node 204-1 has been selected by the compaction engine 150 based on priorities assigned to corresponding nodes associated with compaction jobs by the node compaction prioritization logic 154 (FIG. 1).

The compaction process 300 involves transferring key-value pairs from a parent node to one or more child nodes, in this case from the parent indirect node 204-1 to child indirect nodes 204-11, 204-12, and 204-13. Arrows 302, 304, and 306 in FIG. 3A depict the transfer of key-value pairs from the node buffer of the parent indirect node 204-1 to the child indirect nodes 204-11, 204-12, and 204-13. In FIG. 3A, it is assumed that prior to the compaction process 300, the child indirect node 204-11 has two buffer chunks 204-11-BC, the child node 204-12 has one buffer chunk 204-12-BC, and the child indirect node 204-13 has two buffer chunks 204-13-BC.

Following the compaction process 300 as shown in FIG. 3B, the child indirect node 204-11 has three buffer chunks 204-11-BC', the child indirect node 204-12 has three buffer chunks 204-12-BC', and the child indirect node 204-13 has three buffer chunks 204-13-BC'.

Following the compaction process 300, there are no buffer chunks associated with the parent node 204-1 (i.e., the node buffer of the parent indirect node 204-1 is empty). The node buffer of the indirect node 204-1 can subsequently be filled again as additional fingerprint index updates are received by the storage system 102.

Figure 4:
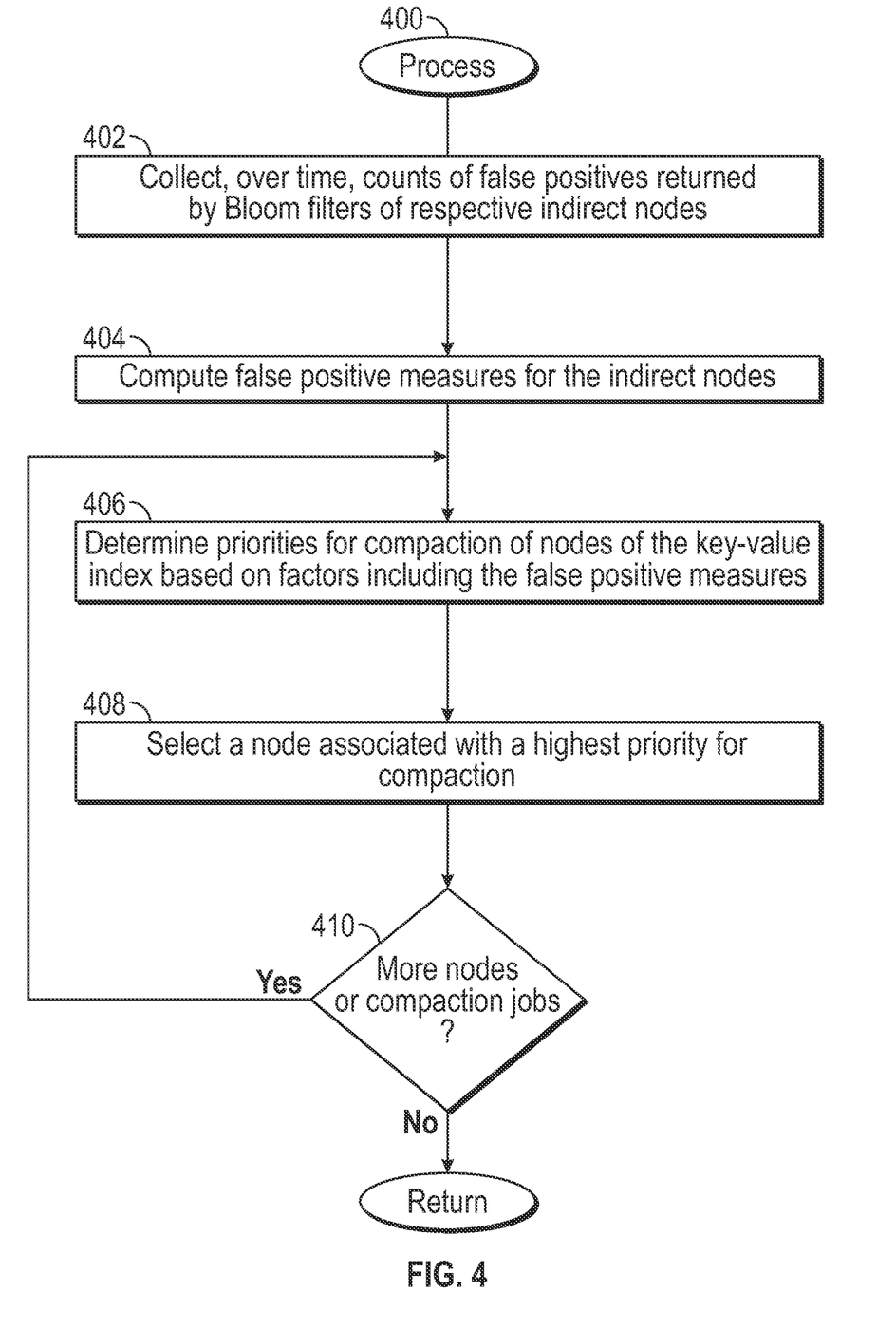
FIG. 4 is a flow diagram of a compaction process according to some examples.

FIG. 4 is a flow diagram of a process 400 performed by the compaction engine 150 according to some examples. The false-positive measurement determination logic 152 collects (at 402), over time, counts of false positives returned by Bloom filters of respective indirect nodes of the key-value index 120. For example, the counts of false positives can be tracked by the false-positive measure determination logic 152 during a sampling interval. After the sampling interval, the false-positive measure determination logic 152 can compute (at 404) the false-positive measure for each indirect node of the key-value index 120 by dividing the count by the time duration of the sampling interval.

Note that the observed false-positive measures can be running measures that are iteratively updated in successive sampling intervals.

Once the false-positive measures are computed by the false-positive measure determination logic 152, the node compaction prioritization logic 154 determines (at 406) priorities for compaction of nodes of the key-value index 120 based on factors including the observed false positive measures. Determining priorities for the compaction of nodes based on the observed false positive measures can include either or both of the following: 1) determining priorities for the selection of nodes of the key-value index 120 for compaction based on observed false positive measures (among multiple factors in some examples) of the nodes, or 2) once compaction jobs are identified for respective nodes, prioritizing the compaction jobs based on observed false positive measures (among multiple factors in some examples) of the respective nodes.

Based on the priorities assigned, the compaction engine 150 selects (at 408) a node associated with a highest priority for compaction. In some examples, the selection (at 408) includes selecting a node to add to the compaction work pile 122 based on a comparison of the priorities assigned to the nodes in the key-value index 120. In other examples, the selection (at 408) includes selecting a compaction job from the compaction work pile 122 to execute based on the priorities assigned to the compaction jobs in the compaction work pile 122.

After moving a compaction job for a node to the work compaction pile 122 or after completion of a compaction job selected from the compaction work pile 122, the compaction engine 150 determines (at 410) whether there are more nodes of the key-value index 120 to consider for adding to the compaction work pile 122 or whether there are more compaction jobs to select (from the compaction work pile 122. In response to determining that there are more nodes or compaction jobs to select, the compaction engine 150 re-iterates through tasks 406, 408, and 410. The process continues for the remaining nodes or compaction jobs. Note that as additional compaction jobs are triggered, the compaction jobs and their respective priorities can be added to the compaction work pile 122. Also, nodes to consider for selection to add to the compaction work pile 122 may be added, such as due to a new node being added to the key-value index 120 or a node having a node buffer usage exceeding the threshold fill level.

Figure 5:
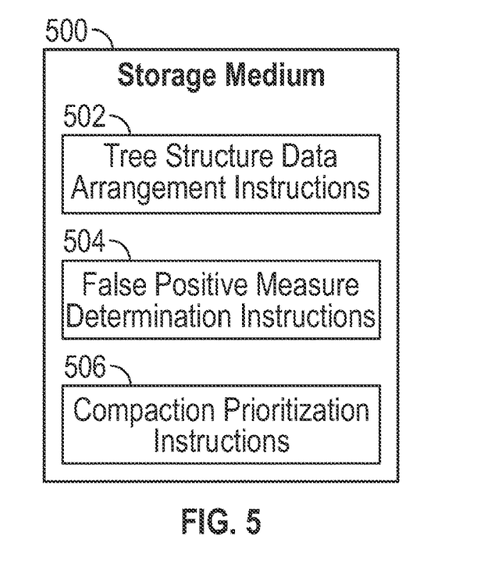
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system can include a computer or multiple computers, such as the storage controller 106 of FIG. 1.

The machine-readable instructions include tree structure data arrangement instructions 502 to arrange data in a plurality of nodes in a tree structure (e.g., the tree structure of the key-value index 120 of FIG. 1). The plurality of nodes include higher level nodes and lower level nodes, where a given node of the plurality of nodes is associated with a probabilistic data structure (e.g., a Bloom filter) that provides a probabilistic indication of whether data is present in the given node.

The machine-readable instructions include false positive measure determination instructions 504 (e.g., instructions of the false positive measure determination logic 152 of FIG. 1) to determine, for reads of the given node, a false positive measure of false positives indicated by the probabilistic data structure, where a false positive occurs if the probabilistic data structure indicates that data is present in the given node when the data is not present in the given node.

The machine-readable instructions include compaction prioritization instructions 506 (e.g., instructions of the node compaction prioritization logic 154 of FIG. 1) to prioritize a compaction of the given node based on the determined false positive measure, where the compaction of the given node includes transferring data in the given node to another node in the tree structure.

In some examples, the prioritizing of the compaction of the given node includes setting a higher priority for the compaction of the given node responsive to a higher false positive measure, and setting a lower priority for the compaction of the given node responsive to a lower false positive measure. This allows a node with a higher false positive measure to be selected with higher priority for compaction, after which the false positives for the node should be reduced.

In some examples, the data in the plurality of nodes in the tree structure includes key-value pairs, where each key-value pair of the key-value pairs includes a fingerprint of a data unit and location information (e.g., the storage location indicator discussed above) of the data unit. Compacting key-value pairs of the given node moves the key-value pairs to child node(s) of the given node, so that the amount of data in a node buffer of the given node is reduced and thus false positives produced by the probabilistic data structure of the given node are reduced.

In some examples, prioritizing the compaction of the given node based on the determined false positive measure includes setting a first priority for the compaction of the given node, and the machine-readable instructions are executable to compare a plurality of priorities (including the first priority) set for respective nodes of the plurality of nodes, and select a node of the plurality of nodes based on the comparison of the plurality of priorities.

In some examples, a higher priority is assigned to the compaction job for a first node than a priority assigned to a compaction job for a second node of the plurality of nodes responsive to the false positive measure determined for the first node being higher than a false positive measure determined for the second node, even though the node buffer of the second node has more data than the node buffer of the first node. Thus, for example, even though the second node may have more key-value pairs, such key-value pairs in the second node may be accessed less frequently than key-value pairs in the first node, and thus the second node would be associated with less false positives.

In further examples, prioritizing the compaction of the given node includes selecting, from among the plurality of nodes, the given node for which to add a compaction job to a compaction job scheduling structure.

In some examples, each respective node of the plurality of nodes includes a respective node buffer to store respective data of the respective node. The machine-readable instructions are executable to create a compaction job for the respective node responsive to an amount of data in the respective node exceeding a threshold amount (e.g., the threshold fill level noted above). The prioritizing of the compaction of the given node includes prioritizing a compaction job created for the given node responsive to an amount of data in the given node exceeding the threshold amount.

In some examples, machine-readable instructions are executable to store information of compaction jobs in a compaction job scheduling structure (e.g., the compaction work pile 122 of FIG. 1), and schedule the compaction jobs based on priorities assigned to the compaction jobs. By using the compaction job scheduling structure, the compaction jobs in the compaction job scheduling structure can be performed asynchronously with respect to any merge operation that merges fingerprint index updates in the update buffer 118 (FIG. 1) into nodes of the tree structure.

Figure 6:
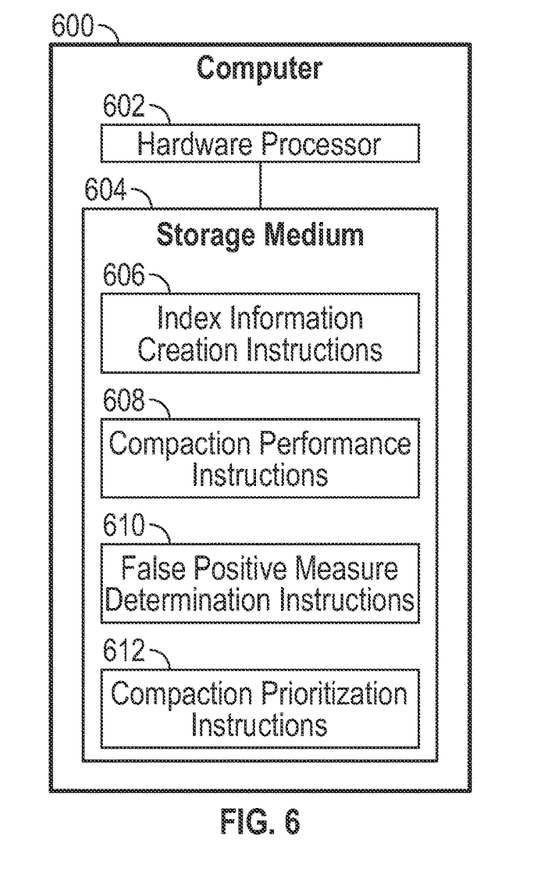
FIG. 6 is a block diagram of a system according to some examples.

FIG. 6 is a block diagram of a computer 600 (e.g., the storage controller 106 of FIG. 1) that includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The computer 600 includes a non-transitory storage medium 604 storing machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include index information creation instructions 606 to, for incoming data units to be stored in a storage system, create index information (e.g., the fingerprint index updates 109 of FIG. 1) to merge into an index tree structure (e.g., the key-value index 120 of FIG. 1). The index tree structure includes a plurality of nodes including higher level nodes and lower level nodes, where a given node of the plurality of nodes is associated with a probabilistic data structure that provides a probabilistic indication of whether data is present in the given node.

The machine-readable instructions in the storage medium 604 include compaction performance instructions 608 to perform compactions of selected nodes of the plurality of nodes asynchronously with the merging of the index information into the index tree structure.

The machine-readable instructions in the storage medium 604 include false positive measure determination instructions 610 to determine, for reads of the given node, a false positive measure of false positives indicated by the probabilistic data structure, where a false positive occurs if the probabilistic data structure indicates that data is present in the given node when the data is not present in the given node.

The machine-readable instructions in the storage medium 604 include compaction prioritization instructions 612 to prioritize a compaction of the given node based on the determined false positive measure, where the compaction of the given node includes transferring data in the given node to another node in the index tree structure.

The performance of the compactions is according to prioritization of compactions of the selected nodes.

Figure 7:
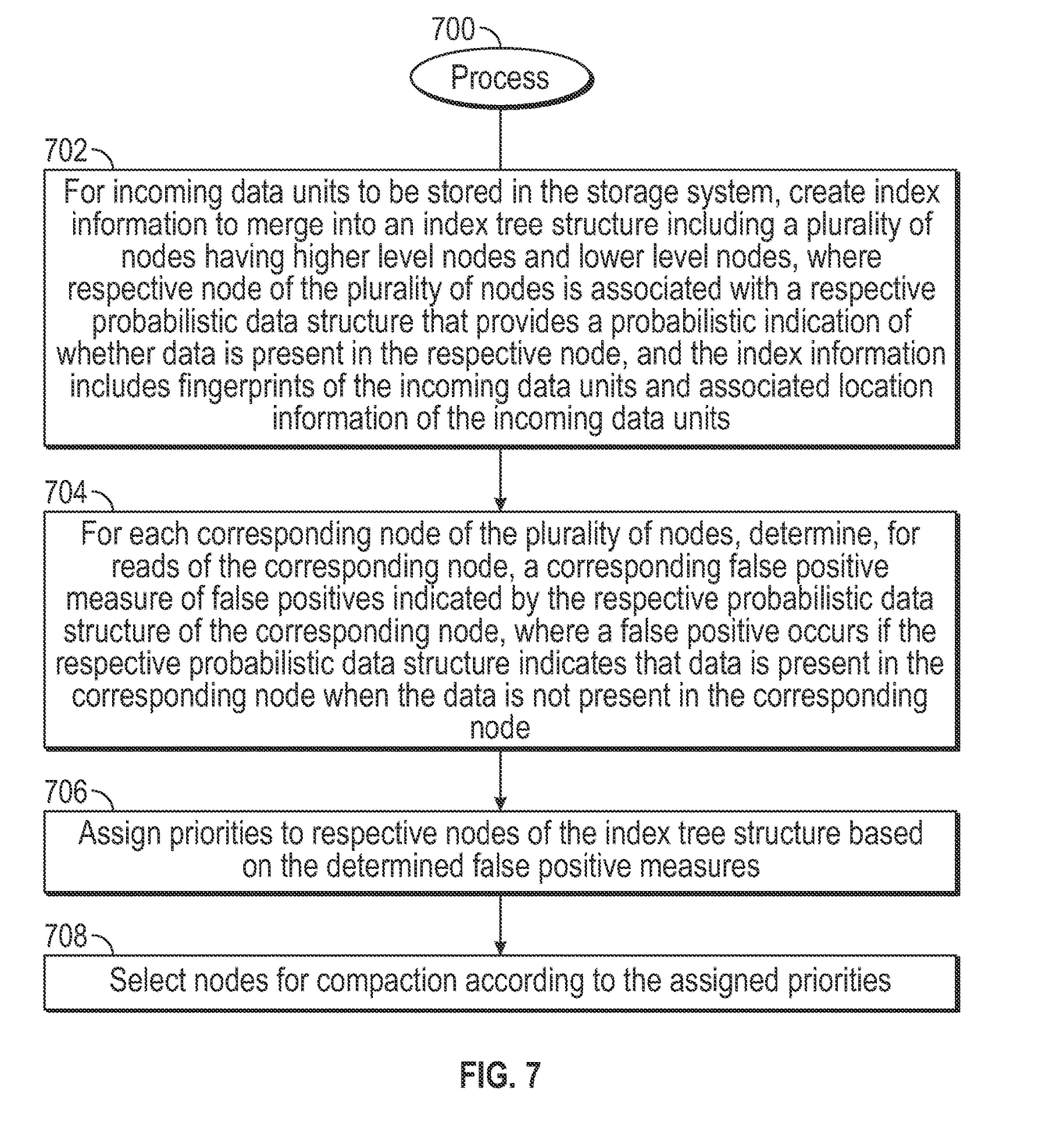
FIG. 7 is a flow diagram of a process according to further examples.

FIG. 7 is a flow diagram of a process 700 according to some examples. The process 700 includes, for incoming data units to be stored in the storage system, creating (at 702) index information to merge into an index tree structure including a plurality of nodes having higher level nodes and lower level nodes, where each respective node of the plurality of nodes is associated with a respective probabilistic data structure that provides a probabilistic indication of whether data is present in the respective node, and the index information includes fingerprints of the incoming data units and associated location information of the incoming data units.

The process 700 includes, for each corresponding node of the plurality of nodes, determining (at 704), for reads of the corresponding node, a corresponding false positive measure of false positives indicated by the respective probabilistic data structure of the corresponding node, where a false positive occurs if the respective probabilistic data structure indicates that data is present in the corresponding node when the data is not present in the corresponding node.

The process 700 includes assigning (at 706) priorities to respective nodes of the index tree structure based on the determined false positive measures. Assigning priorities to the respective nodes can refer to 1) assigning priorities for the selection of nodes of the key-value index 120 for compaction based on the false positive measures (among multiple factors in some examples) of the nodes, or 2) assigning priorities to the compaction jobs in the compaction work pile 122 based on observed false positive measures (among multiple factors in some examples) of the respective nodes.

The process 700 includes selecting (at 710) nodes of the index tree structure for compaction according to the assigned priorities.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   arrange data in a plurality of nodes in a tree structure, the plurality of nodes comprising higher level nodes and lower level nodes, wherein a given node of the plurality of nodes is associated with a probabilistic data structure that provides a probabilistic indication of whether data is present in the given node;
   determine, for reads of the given node, a false positive measure of false positives indicated by the probabilistic data structure, wherein a false positive occurs if the probabilistic data structure indicates that data is present in the given node when the data is not present in the given node; and
   prioritize a compaction of the given node based on the determined false positive measure, wherein the compaction of the given node comprises transferring data in the given node to another node in the tree structure.

2. The non-transitory machine-readable storage medium of claim 1, wherein the probabilistic data structure comprises a Bloom filter.

3. The non-transitory machine-readable storage medium of claim 1, wherein the prioritizing of the compaction of the given node comprises:
   setting a higher priority for the compaction of the given node responsive to a higher false positive measure, and
   setting a lower priority for the compaction of the given node responsive to a lower false positive measure.

4. The non-transitory machine-readable storage medium of claim 1, wherein the compaction of the given node comprises transferring the data in the given node to at least one child node of the given node.

5. The non-transitory machine-readable storage medium of claim 1, wherein the data in the plurality of nodes in the tree structure comprise key-value pairs, each key-value pair of the key-value pairs comprising a fingerprint of a data unit and location information of the data unit.

6. The non-transitory machine-readable storage medium of claim 1, wherein prioritizing the compaction of the given node based on the determined false positive measure comprises setting a first priority for the compaction of the given node, and wherein the instructions upon execution cause the system to:
   compare a plurality of priorities set for respective nodes of the plurality of nodes, the plurality of priorities comprising the first priority; and
   select a node of the plurality of nodes based on the comparison of the plurality of priorities.

7. The non-transitory machine-readable storage medium of claim 1, wherein each respective node of the plurality of nodes comprises a respective node buffer to store respective data of the respective node, and wherein the instructions upon execution cause the system to:
   create a compaction job for the respective node responsive to an amount of data in the respective node exceeding a threshold amount,
   wherein the prioritizing of the compaction of the given node comprises prioritizing a compaction job created for the given node, the compaction job created for the given node responsive to an amount of data in the given node exceeding the threshold amount.

8. The non-transitory machine-readable storage medium of claim 7, wherein the instructions upon execution cause the system to:
   store information of compaction jobs in a compaction job scheduling structure; and
   schedule the compaction jobs based on priorities assigned to the compaction jobs.

9. The non-transitory machine-readable storage medium of claim 7, wherein the instructions upon execution cause the system to:
   assign a higher priority to the compaction job for the given node than a priority assigned to a compaction job for a further node of the plurality of nodes responsive to the false positive measure determined for the given node being higher than a false positive measure determined for the further node.

10. The non-transitory machine-readable storage medium of claim 7, wherein the instructions upon execution cause the system to:
    assign a higher priority to the compaction job for the given node than a priority assigned to a compaction job for a further node of the plurality of nodes responsive to the false positive measure determined for the given node being higher than a false positive measure determined for the further node, even though the node buffer of the further node has more data than the node buffer of the given node.

11. The non-transitory machine-readable storage medium of claim 7, wherein the instructions upon execution cause the system to:
    responsive to a read request of the given node:
       determine if the probabilistic data structure returns a positive indication probabilistically indicating that data for the read request is present in the node buffer of the given node, and
       in response to the positive indication, read a portion of data in the node buffer of the given node into a memory.

12. The non-transitory machine-readable storage medium of claim 11, wherein if the positive indication is a false positive, the portion of data read into the memory does not include data for the read request.

13. The non-transitory machine-readable storage medium of claim 1, wherein the prioritizing of the compaction of the given node comprises selecting, from among the plurality of nodes, the given node for which to add a compaction job to a compaction job scheduling structure.

14. The non-transitory machine-readable storage medium of claim 1, wherein the data in the plurality of nodes in the tree structure comprise fingerprints of data units and associated location information of the data units, and wherein the instructions upon execution cause the system to:
    merge updates for incoming data units into the tree structure,
    wherein compactions of nodes of the plurality of nodes are performed independently of any merging of updates for incoming data units into the tree structure.

15. A computer comprising:
    a processor; and a non-transitory storage medium comprising instructions executable on the processor to:
for incoming data units to be stored in a storage system, create index information to merge into an index tree structure comprising a plurality of nodes comprising higher level nodes and lower level nodes, wherein a given node of the plurality of nodes is associated with a probabilistic data structure that provides a probabilistic indication of whether data is present in the given node;
perform compactions of selected nodes of the plurality of nodes asynchronously with the merging of the index information into the index tree structure;
determine, for reads of the given node, a false positive measure of false positives indicated by the probabilistic data structure, wherein a false positive occurs if the probabilistic data structure indicates that data is present in the given node when the data is not present in the given node; and
prioritize a compaction of the given node based on the determined false positive measure, wherein the compaction of the given node comprises transferring data in the given node to another node in the index tree structure,
wherein performing the compactions is according to prioritization of compactions of the selected nodes.

16. The computer of claim 15, wherein the instructions are executable on the processor to:
compute the false positive measure based on a quantity of false positives in a time interval associated with the reads of the given node.

17. The computer of claim 15, wherein the index information comprises fingerprints of the incoming data units and associated location information of the incoming data units, and wherein the compaction of the given node transfers fingerprints and associated location information in a node buffer of the given node to child nodes of the given node.

18. The computer of claim 15, wherein the instructions are executable on the processor to:
assign a higher priority to the given node than a priority assigned to a further node of the plurality of nodes responsive to the false positive measure determined for the given node being higher than a false positive measure determined for the further node, even though a node buffer of the further node has more data than a node buffer of the given node.

19. A method executed by a storage controller of a storage system, comprising:
for incoming data units to be stored in the storage system, creating index information to merge into an index tree structure comprising a plurality of nodes comprising higher level nodes and lower level nodes, wherein each respective node of the plurality of nodes is associated with a respective probabilistic data structure that provides a probabilistic indication of whether data is present in the respective node;
for each corresponding node of the plurality of nodes, determining, for reads of the corresponding node, a corresponding false positive measure of false positives indicated by the respective probabilistic data structure of the corresponding node, wherein a false positive occurs if the respective probabilistic data structure indicates that data is present in the corresponding node when the data is not present in the corresponding node;
assigning priorities to respective nodes of the index tree structure based on the determined false positive measures; and
selecting nodes of the index tree structure for compaction according to the assigned priorities, wherein a compaction of a node comprises transferring data in the node to a lower node in the index tree structure.

20. The method of claim 19, comprising creating a compaction job for a given node of the selected nodes responsive to a node buffer of the given node being filled with index information exceeding a threshold amount.

* * * * *